United States Patent
Huang et al.

(10) Patent No.: US 12,488,860 B2
(45) Date of Patent: Dec. 2, 2025

(54) METHODS, MEDIUMS, AND SYSTEMS FOR IDENTIFYING A GENE IN A FLOURESCENCE IN-SITU HYBRIDIZATION EXPERIMENT

(71) Applicant: Applied Materials, Inc., Santa Clara, CA (US)

(72) Inventors: Mike Jin-An Huang, Genome (SG); Yun-Ching Chang, San Jose, CA (US); Dan Xie, Pleasanton, CA (US); Kok Hao Chen, Genome (SG); Shijie Nigel Chou, Genome (SG)

(73) Assignee: Applied Materials, Inc., Santa Clara, CA (US)

( * ) Notice: Subject to any disclaimer, the term of this patent is extended or adjusted under 35 U.S.C. 154(b) by 1177 days.

(21) Appl. No.: 17/328,638

(22) Filed: May 24, 2021

(65) Prior Publication Data
US 2022/0375546 A1  Nov. 24, 2022

(51) Int. Cl.
*G16B 40/20* (2019.01)
*C12Q 1/6841* (2018.01)
*G06T 7/00* (2017.01)
*G16B 45/00* (2019.01)

(52) U.S. Cl.
CPC .......... *G16B 40/20* (2019.02); *C12Q 1/6841* (2013.01); *G06T 7/0012* (2013.01); *G16B 45/00* (2019.02); G06T 2207/10064 (2013.01); G06T 2207/20076 (2013.01); G06T 2207/20081 (2013.01); G06T 2207/20084 (2013.01)

(58) Field of Classification Search
CPC ...... G16B 40/20; G16B 45/00; C12Q 1/6841; G06T 7/0012
See application file for complete search history.

(56) References Cited

U.S. PATENT DOCUMENTS 9,739,783 B1  8/2017  Kumar et al.

OTHER PUBLICATIONS

International Search Report and Written Opinion dated Sep. 15, 2022, for the International Patent Application No. PCT/US2022/030350, filed on May 20, 2022, 8 pages.
Gudla, Prabhakar R. et al., 'SpotLearn: convolutional neural network for detection of fluorescence in situ hybridization (FISH) signals in high-throughput imaging approaches', Cold Spring Harbor Symposia On Quantitative Biology, Nov. 28, 2017 (published online), vol. 82, pp. 57-70.
Zakrzewski, Falk et al., 'Automated detection of the HER2 gene amplification status in fluorescence in situ hybridization images for the diagnostics of cancer tissues', Scientific Reports, Jun. 3, 2019 (published online), vol. 9, article No. 8231, pp. 1-12.
Schmell, Sarah et al., 'An interpretable automated detection system for FISH-based HER2 oncogene amplification testing in histopathological routine images of breast and gastric cancer diagnostics', arXiv: 2005.12066v1, Medical Imaging with Deep Learning 2020—short paper, May 25, 2020, pp. 1-6.
Torada, Luis et al., 'ImaGene: a convolutional neural network to quantify natural selection from genomic data', BMC Bioinformatics, 2019, vol. 20, Suppl. 9, article No. 337, pp. 1-12.

*Primary Examiner* — Jerry Lin
(74) *Attorney, Agent, or Firm* — KDW Firm PLLC

(57) ABSTRACT

Exemplary embodiments provide methods, mediums, and systems for processing multiplexed image data from a fluorescence in-situ hybridization (FISH) experiment. According to exemplary embodiments, a convolutional neural network (CNN) may be applied to the image data to localize and identify hybridization spots in images corresponding to different sets of targeting probes. The CNN is configured in such a way that it is able to discriminate hybridization spots in situations that are difficult for conventional techniques. The CNN may be trained on a relatively small amount of data by exploiting the nature of the FISH codebook.

27 Claims, 12 Drawing Sheets

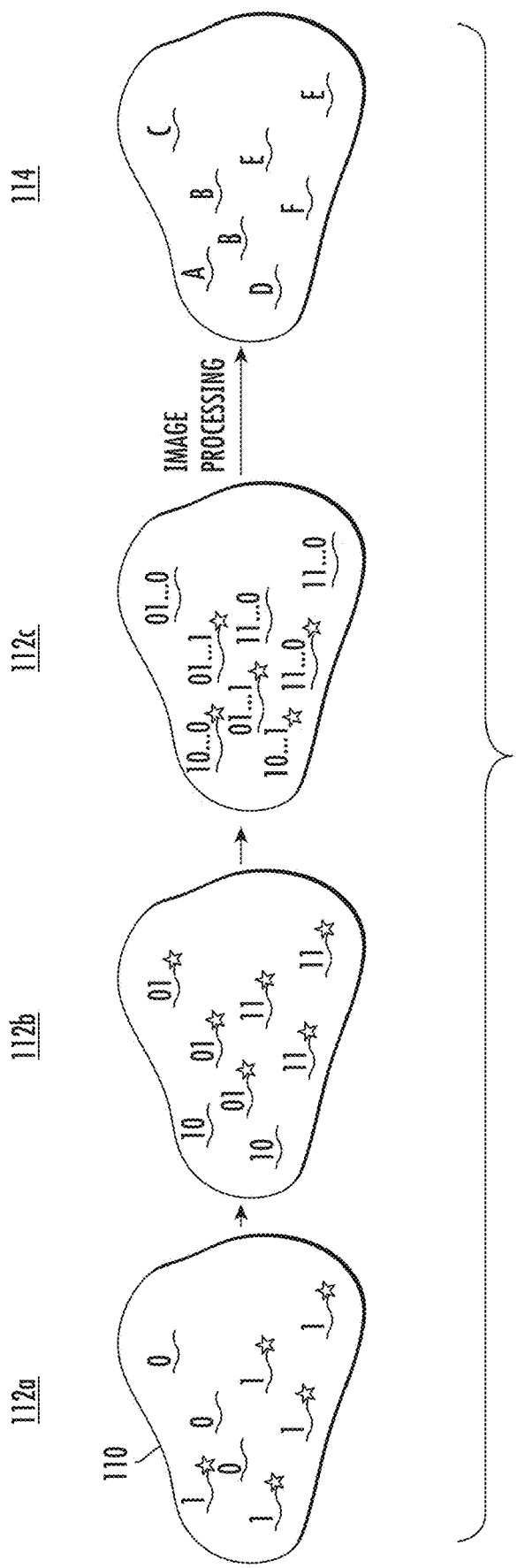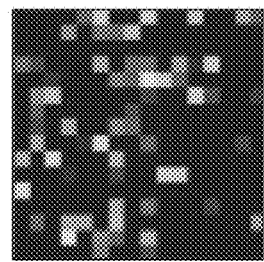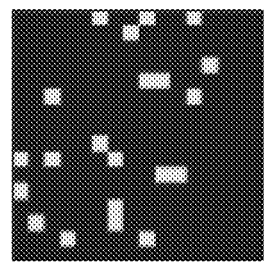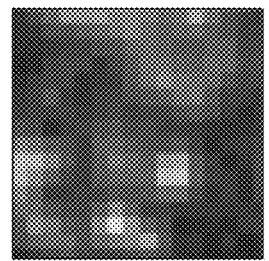
FIG. 1B
FIG. 1C
FIG. 1D
FIG. 1E

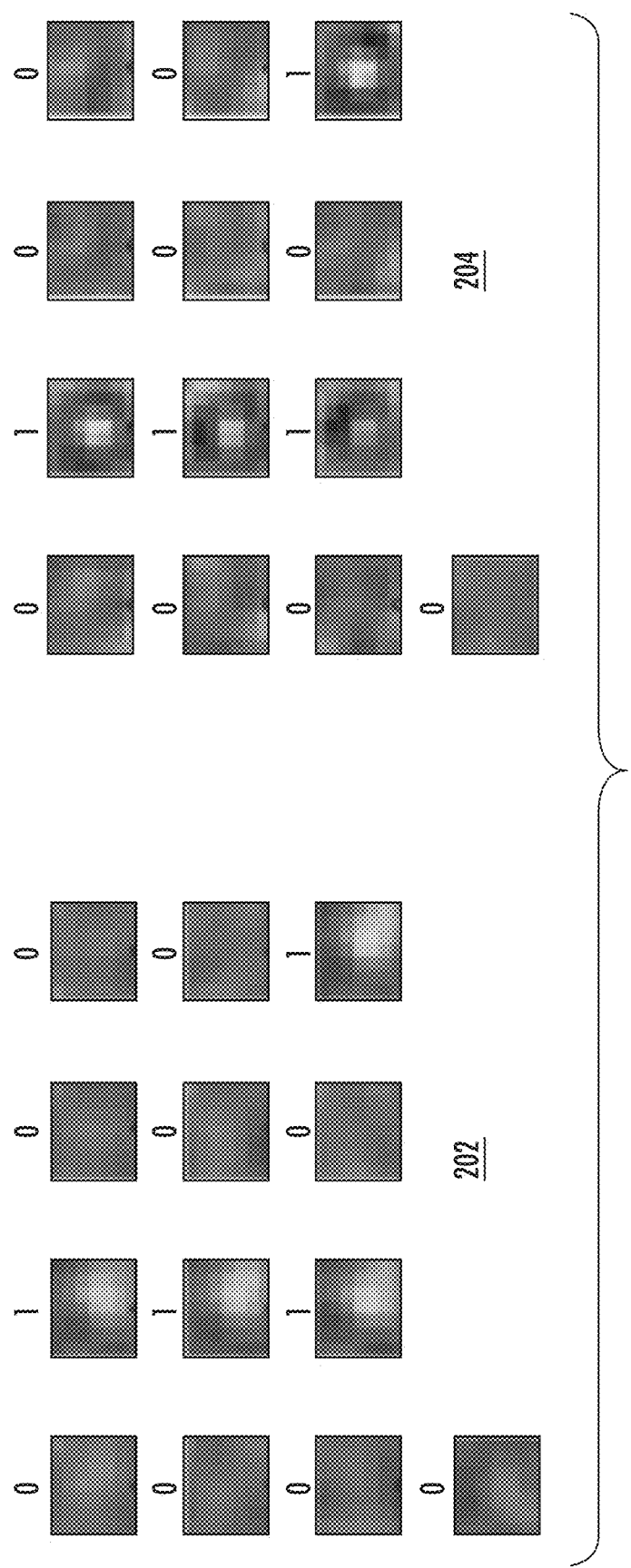

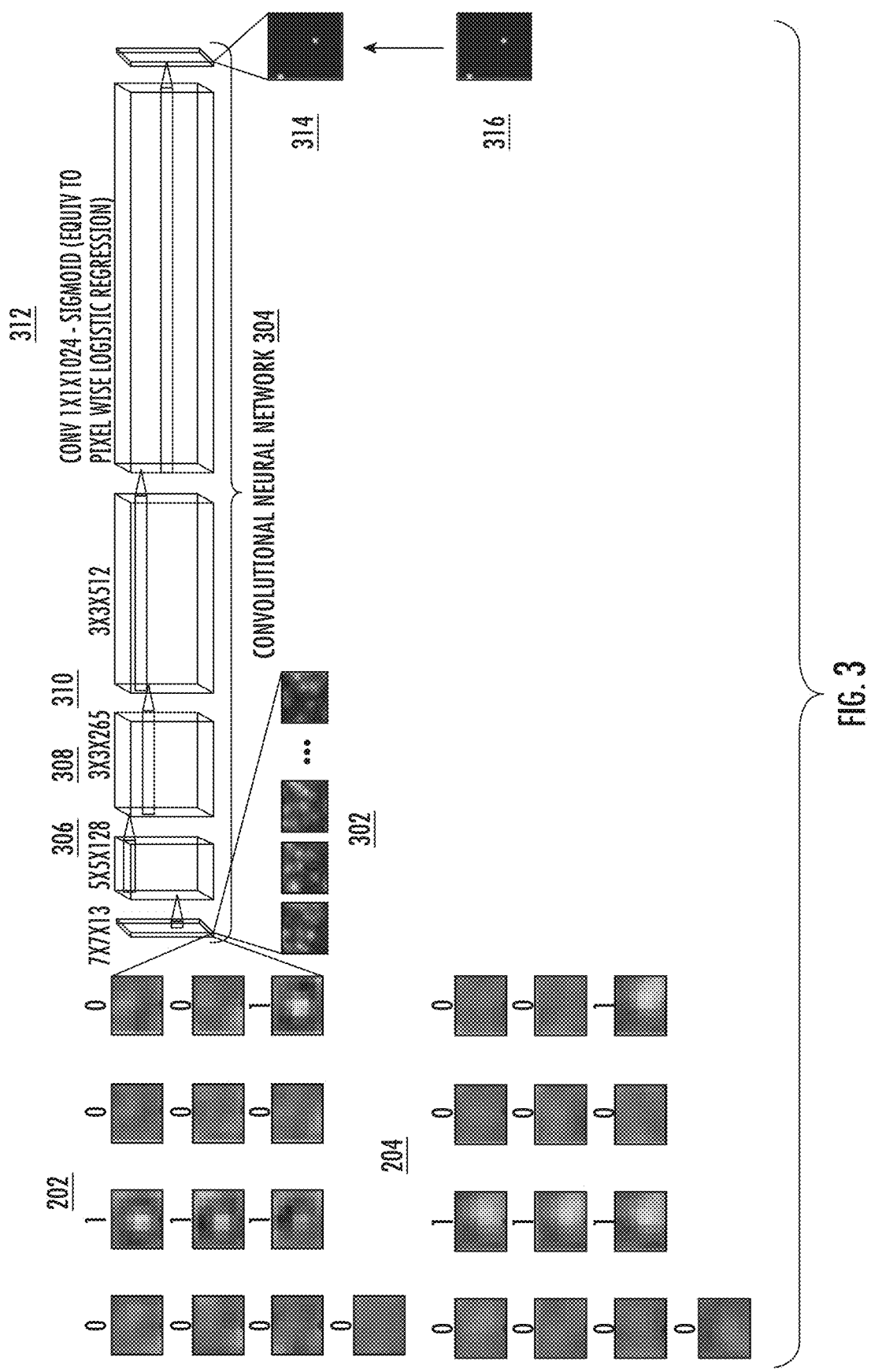

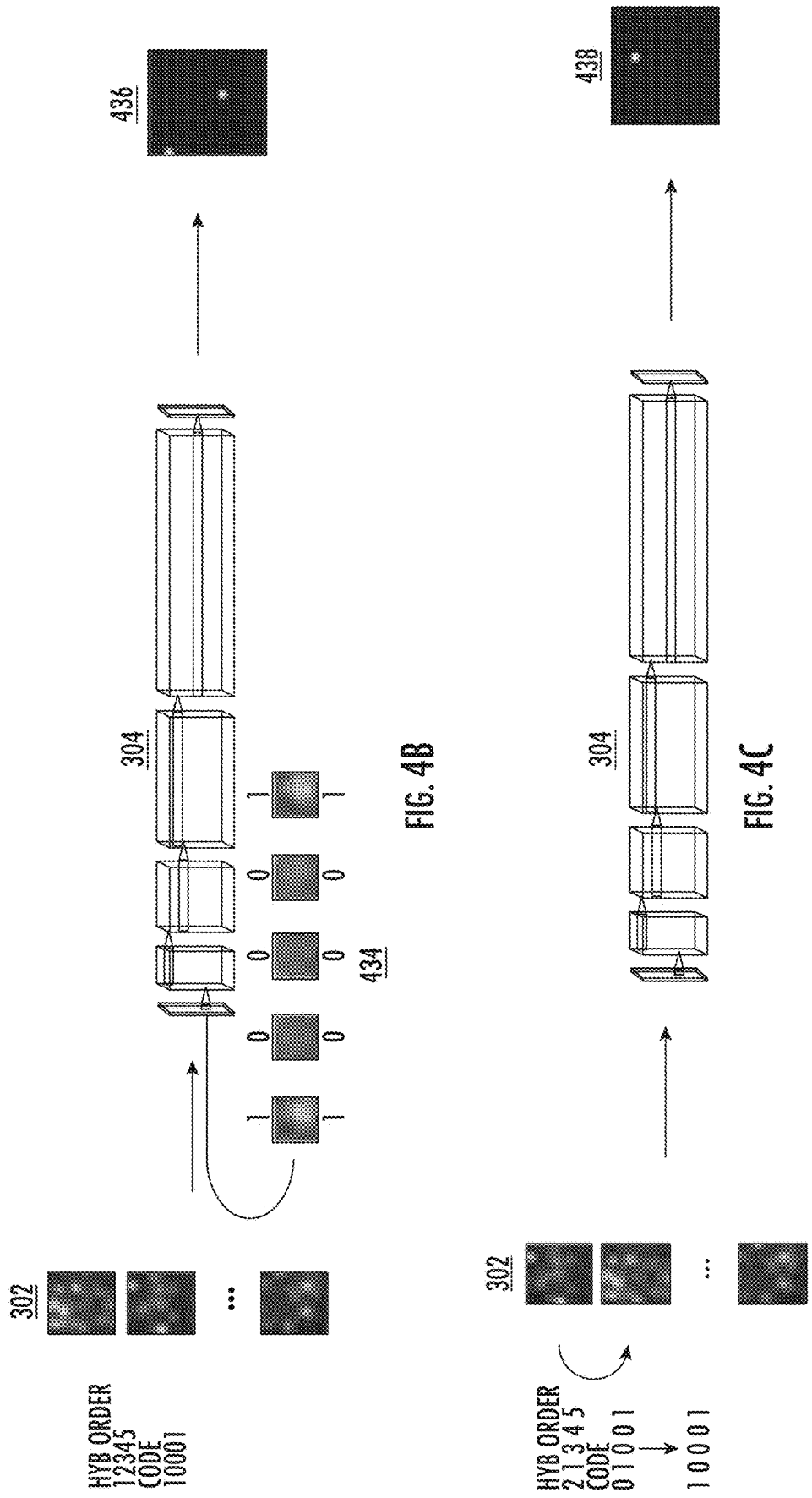

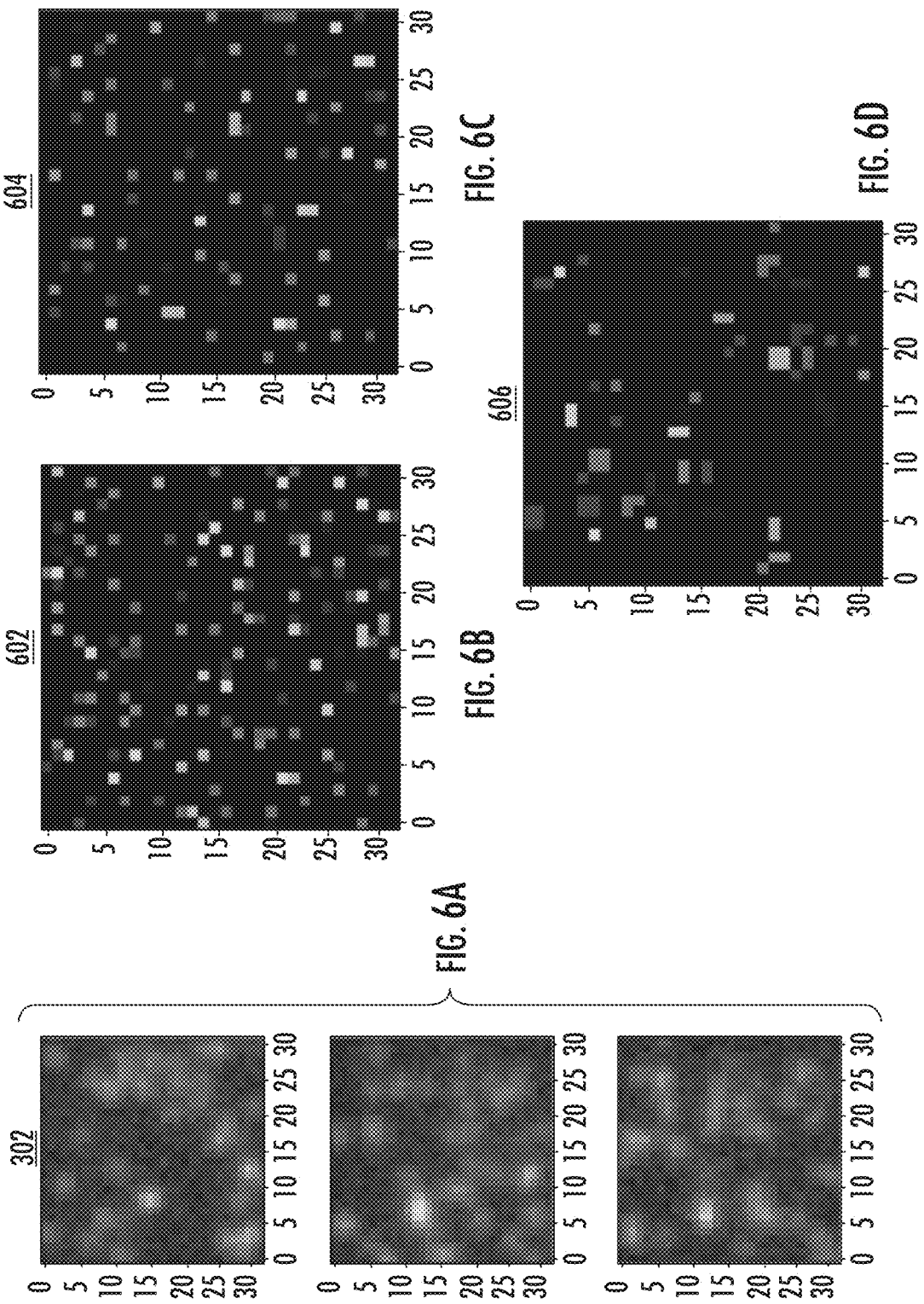

METHODS, MEDIUMS, AND SYSTEMS FOR IDENTIFYING A GENE IN A FLOURESCENCE IN-SITU HYBRIDIZATION EXPERIMENT

BACKGROUND

Transcriptomics is the study of transcriptomes, which are the collection of ribonucleic acid (RNA) transcripts present in an organism, group of cells, or individual cell. By identifying the number and distribution of individual transcripts within a cell, transcriptomics can provide researchers with an understanding of which processes are active and which are dormant in the cell. Transcriptomics is often used in genetic counseling, medicine, and to identify species.

One example of a technique used in transcriptomics is fluorescence hybridization. Hybridization experiments use deoxyribonucleic acid (DNA)/RNA probes to peer into the cells of an organ or tissue. A probe refers to a single strand of DNA or RNA that is complimentary to a nucleotide sequence of interest. For example, a probe may take the form of an oligonucleotide ("oligo"), with multiple such probes arranged into a grid in a microarray. The probes bind to the sequence of interest when it is present in the sample and then are caused to fluoresce, thereby allowing researchers to identify the presence and location of the sequence of interest in the sample.

Older fluorescence in-situ hybridization (FISH) techniques involved applying probes that would target only one RNA species at a time. In order to detect multiple target RNA strands within the cell, and to distinguish between cellular background and stray probes, multiple probes may be applied to a sample. Moreover, many different probes had to be applied to a sample in order to identify different RNA species present. An example of this technique is single molecule fluorescence in situ hybridization (smFISH). Although effective, this tended to be a very slow process as each experimental run targeted only a single RNA species out of the hundreds or thousands that might be present in a transcriptome.

More recently, multiplexed FISH techniques have been developed. In these techniques, different probes may be applied simultaneously to the sample, where the different probes each fluoresce in different colors. By reading the colors of the fluorescence, one could study multiple different target RNA sequences at the same time and infer more details about their spatial distribution within the transcriptome. Even so, there are only a limited number of colors that can be distinguished, and so even the best smFISH techniques that applied multiplexing in this manner were able to simultaneously measure about 10-30 RNA species.

A combinatorial FISH transcriptomics approach, referred to as Multiplexed FISH, including Multiplexed, Error-Robust FISH (MERFISH) and sequential FISH (seqFISH), was developed. This combinatorial approach associates a unique barcode with each RNA species, and then reads these barcodes through a series of sequential hybridizations and measurements. More specifically, each RNA species' barcode may be represented as a series of bits ("1"s or "0" s). Probes are applied to a sample and caused to fluoresce. If a given location lights up, it is assigned a "1"; if not, it is assigned a "0". Then, another set of probes is applied, and a second bit is read for each location. The number of rounds of imaging to be applied depends on the length of the barcode (and, by association, the total number of RNA species that are being considered). For example, a 16-bit barcode can generate $2^{16}$, or about 65,000, barcodes. The set of barcodes and their mappings to specific RNA sequences is referred to as a "codebook."

To introduce an error robust encoding scheme, each barcode may be M Hamming distance (number of bit flips) in respect to each other and have a Hamming weight (number of on-bits) of M. For example, in a codebook with a minimum Hamming distance of 4 (HD4 code), four bits must be read incorrectly for one barcode to be changed to another. A single-bit change is similar enough to the original barcode that it can be detected and corrected. A two-bit change would become ambiguous between two barcodes and thus can be detected but not corrected.

BRIEF SUMMARY

According to a first embodiment, image data may be received from a fluorescence in-situ hybridization (FISH) experiment, the image data comprising a plurality of images, each image resulting from a hybridization of a sample (generally using a pool of probes). The image data may be provided to a convolutional neural network (CNN) having multichannel convolutional layers, where the CNN is configured to analyze an area around a fluorescence point in the image data using a kernel. The kernel may be applied to identify a barcode for the given fluorescence point. The barcode may be a binary barcode, but exemplary embodiments are also applicable to more complex barcodes such as quaternary codes. The barcodes may then be used to identify a gene associated with the fluorescence point.

Because the CNN uses both the spatial and temporal features to segment the barcodes, it can be better than conventional techniques at addressing certain problematic conditions, such as intensity variations, misaligned spots, noisy spots, and partially overlapping spots.

Furthermore, although applying a CNN requires more time and processing power overall than more conventional techniques, CNNs are highly parallelizable and the workload can therefore be distributed more readily between processors. Thus, better results can be achieved in the same (or even less) time than conventional techniques.

Moreover, once the CNN is suitably trained, there may be fewer parameters to optimize during processing. For instance, it may be able to accurately identify genes by defining only an activation threshold (the lower limit, above which a target is considered to be fluorescing). On the other hand, conventional techniques might need to optimize a decoding process to determine which spots belong to which genes, the size of the spot, the distance to the reference barcode, the intensity factor, etc.

According to a second embodiment, the first convolutional layer may include a number of channels corresponding to a number of bits in a barcode associated with the FISH experiment. By establishing the number of channels in the kernels to be equal to the size of the barcode, the CNN can more efficiently learn the spatial features in each image and their patterns across all bits, which makes it easier to identify the gene associated with the fluorescence spots. Some embodiments can also be used with a different number of channels (not corresponding to the number of bits in the barcode).

Furthermore, although some embodiments are specifically described with reference to MERFISH data, it is contemplated that the techniques described herein can be used with any type of coded FISH technique. Embodiments are also not limited to binary barcodes, but can also be used with more complex codes such as ternary, quaternary, or more, codes.

According to a third embodiment, the CNN may be three-dimensional, and the image data may include three-dimensional voxel data. This allows the CNN to jointly learn the three-dimensional point spread function and perform the three-dimensional segmentation of barcodes. This allows the CNN to rapidly identify genes distributed in three-dimensional space, rather than breaking the three-dimensional space into individual planes and identifying the genes in each plane separately.

According to a fourth embodiment, the kernel may have a size corresponding to a point spread function around a fluorescence point in the image data (e.g., 7 pixels by 7 pixels, although this may vary depending on the equipment used and the application). By setting the size of the kernel approximately equal to the size of the point spread function, the system can fit the entire fluorescing area into a kernel without including excess image data. When too little image data is included in the kernel (e.g., where the point spread function extends beyond a given kernel), a single kernel may no longer represent an entire point spread function and would require additional kernels to combine in order to represent a point spread function, and identification accuracy may decrease. When too much image data is included, accuracy does not necessarily increase but excess processing resources are used unnecessarily.

According to a fifth embodiment, the CNN may include at least one of a rectified linear unit (ReLU) layer or a batch normalization (batchnorm) layer, one or both of the ReLU layer or the batchnorm layer being configured to extract features with higher order complexities than would be extracted without the ReLU or batchnorm layer. As noted above, the use of these layers deeper in the neural network allows higher order complexities to be extracted from the image data. Batch normalization is applied after the activation function to address a problem with conventional techniques (particularly the pixel-based method, discussed in more detail below), which are known to be unable to precisely normalize the image intensities across the channels. Dropout regularization may also be applied to reduce overfitting and improve generalization to non-training data.

According to a sixth embodiment, a final layer of the CNN may encode each respective pixel of the image data as a vector of latent features (e.g., a 1024-bit vector), and apply pixelwise logistic regression with a 1×1 convolutional kernel, to classify an output of the layer as a probability of a target gene being localized at the respective pixel. The latent features consist of the complex spatiotemporal patterns that are informative to the presence of the targeted barcode. This technique tends to be much more informative as to whether a spot is being picked up at a given pixel location than conventional, hand-coded alternatives.

According to a seventh embodiment, the CNN may also be trained in a particular way. The training may involve retrieving training image data having a plurality of channels arranged in an original order, identifying a surrogate code pattern associated with the original order, identifying one or more of the channels that are in an on configuration and one or more channels that are in an off configuration, and training the CNN to activate to the surrogate code pattern using a plurality of generated training sets, each set comprising the plurality of channels with the on-bits rearranged in varying permutations so that an arrangement of the on-configuration channels in each training set corresponds to the original order.

A problem can arise when performing the training on a subset of barcodes and generalizing to other barcodes in that different channels can have different statistical distributions of the intensities—the normalization of the images may be imprecise, the number of genes represented in each hybridization round may vary, there may be experimental noise such as probe binding affinity variations or probe disassociations across hybridization rounds, etc. Data augmentation can be performed by creating additional training sets with the image channels rearranged in each permutation of the on-bits and randomly shuffling the channels of the off-bits. Each such training set would have a different pattern of input distributions, but since each training set has the same target label (the surrogate barcode), the network learns to be invariant to varying input distributions.

According to an eight embodiment, the training may also include randomly assigning the off-configuration channels among the on-configuration channels so that an arrangement of the off-configuration channels corresponds to the original order. This allows even more variable training sets to be developed from the same image data, which reinforces and augments the advantages of the seventh embodiment.

According to a ninth embodiment, the training may further include applying the trained CNN to the image data to infer the binary code, where the binary code differs from the surrogate code. FISH barcodes are designed so that each different code has the same number of on-bits. Given this, any barcode can be rearranged into any other barcode. Accordingly, the CNN can be trained to recognize only one barcode from the experiment's codebook. When the CNN is then applied in an inference step, the trained CNN can then recognize any barcode from the codebook by rearranging the on/off kernels into the pattern of the surrogate barcode.

According to a tenth embodiment, the training data may be generated in several ways. This may include existing methods for segmenting or localizing spots, including the pixel-based decoding or spot-based decoding methods. It may include simulation data where the ground truth positions are known. It can also be from alternative FISH experiments, such as (smFISH), to localize the sequences for a subset or all of the barcodes.

Any of the above embodiments may be implemented as instructions stored on a non-transitory computer-readable storage medium and/or embodied as an apparatus with a memory and a processor configured to perform the actions described above. It is contemplated that these embodiments may be deployed individually to achieve improvements in resource requirements and library construction time. Alternatively, any of the embodiments may be used in combination with each other in order to achieve synergistic effects, some of which are noted above and elsewhere herein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1B illustrates an example of identifying a gene's barcode in a FISH experiment.

FIG. 1C depicts an example of FISH image data.

FIG. 1D depicts an example of processed FISH image data derived from the FISH image data of FIG. 1C FIG. 1E depicts an example of a barcode segmentation map derived from the processed FISH image data of FIG. 1D.

FIG. 2 illustrates examples of multichannel kernel estimates of point spread functions (PSFs) across fluorescent labels hybridized onto an RNA sequence.

FIG. 3 illustrates an exemplary technique for processing FISH image data according to an exemplary embodiment.

FIG. 4B illustrates an example of a training technique suitable for use with exemplary embodiments.

FIG. 4C illustrates an example of an inference technique suitable for use with exemplary embodiments.

FIG. 6A depicts exemplary FISH image data used in a comparison experiment.

FIG. 6B illustrates a barcode segmentation map representing the ground truth barcode segmentation map derived from the FISH image data of FIG. 6A.

FIG. 6C illustrates a barcode segmentation map derived from the FISH image data of FIG. 6A by applying the exemplary convolutional neural network described herein.

FIG. 6D illustrates a barcode segmentation map derived from the FISH image data of FIG. 6A using a conventional technique.

DETAILED DESCRIPTION

Figure 1A:
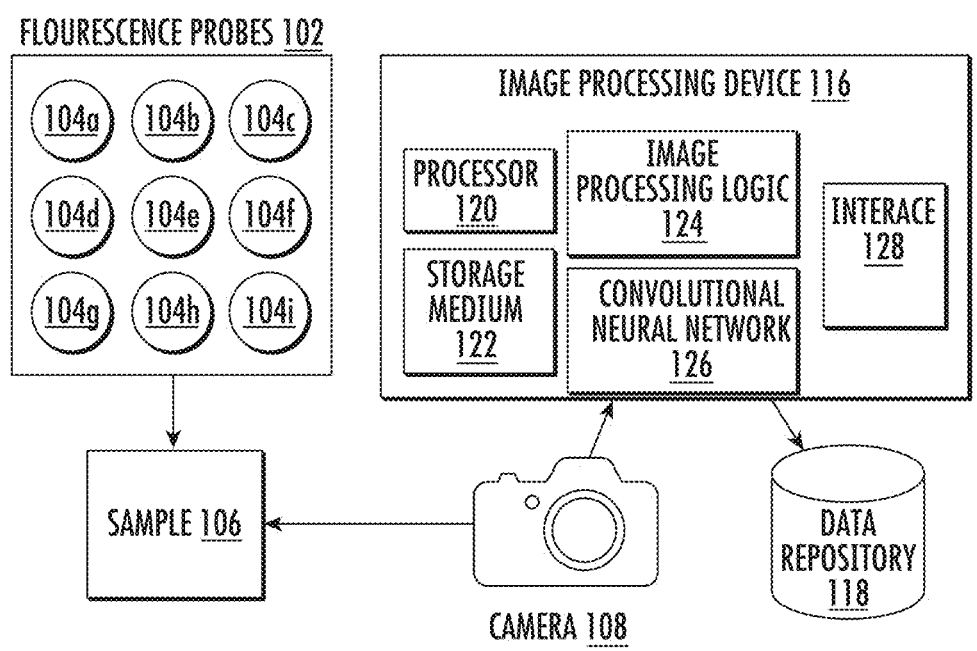
FIG. 1A illustrates an example of an experimental FISH apparatus in accordance with an exemplary embodiment.

Exemplary embodiments described herein provide techniques for recognizing genes in multiplexed fluorescence in-situ hybridization (FISH) experiments. By training and applying a multi-channel convolutional neural network (CNN) to the FISH image data, a number of limitations of conventional FISH image analysis can be overcome. Although exemplary embodiments are described in connection with a CNN, the principles described herein can also be applied to other types of machine learning systems, such as recurrent neural networks (RNNs, such as Long Short-Term Memory or "LSTM" networks) and/or a model applying sequence-to-sequence (seq2seq) learning.

The multi-channel CNN can be used as an image segmentation framework to take an input of a stack of multiplexed fluorescence in situ hybridization images and output a barcode segmentation map consisting of a binary, pixel-wise image that represents the probability of the barcode localized at a given pixel. Each bit of the input stack of images is represented by the channel of images. As a multi-channel convolutional neural network, it extracts both spatial and temporal features to inform its decoding. The spatial features are represented by the first two dimensions of the convolutional kernels, and are identified to be informative due to the physics of the optics transforming the point source fluorescent signal to the signal captured on the camera sensor. This is known as the point spread function (PSF). The temporal features are represented by the channels of the convolutional kernels, and represent the patterns of the barcodes in the codebook. This confers specific advantages as compared to conventional techniques that either use the temporal features (e.g., pixel-based decoding) or the spatial features (e.g., spot based decoding).

The barcode segmentation map used for training may be generated in several ways. This may include existing methods for segmenting or localizing spots, including the pixel-based decoding or spot-based decoding methods. It may include simulation data where the ground truth positions are known. It can also be from alternative FISH experiments, such as (smFISH), to localize the sequences for a subset or all of the barcodes.

Unlike typical image segmentation CNN models, the CNN configured in exemplary embodiments does not use dimension reduction steps such as max pooling or strided convolution. This confers advantages since when decoding spots, the macroscopic features (e.g. the tissue or cellular spatial patterns) are not informative to the decoding. Only the features from a given fluorescing barcode is informative.

A first layer of the CNN may include multiple kernels. This allows basic patterns in the images to be extracted efficiently by convolving over the image data; these basic patterns can then be passed to deeper, hidden layers of the CNN for further processing to extract higher-order complexities.

The CNN may include additional convolutional hidden layers in order to extract features with higher order complexities. A rectified linear unit (ReLU) activation function may be applied to each convolutional layer, introducing non-linearities. Batch normalization may be applied after the activation function to address a problem with conventional techniques (particularly the pixel-based method, discussed in more detail below), which are known to be unable to precisely normalize the image intensities across the channels. Dropout regularization may also be applied to reduce overfitting and improve generalization to non-training data.

The CNN may be trained with a subset of barcodes and generalized to any remaining barcode given a codebook with fixed Hamming weight. This can be achieved by configuring the CNN to perform binary classification in its segmentation, in which it detects the presence of a single designated barcode, referred to as the surrogate barcode. Given that all barcodes are of fixed Hamming weight, a given barcode can be transformed to another barcode by rearranging the order of the bits of the input image channels. Either training or inference with the CNN can be performed on any target barcode by rearranging the input image channels so that the target barcode is transformed to the surrogate barcode.

FIG. 1A illustrates an example of an experimental FISH apparatus in accordance with an exemplary embodiment. As noted above, in a multiplexed FISH experiment, a number of fluorescence probes 102 are applied sequentially to a sample 106. Each of the fluorescence probes 102 may be a single strand of DNA or RNA that is complimentary to a nucleotide sequence of interest. The sample 106 may be biological material, such as an organism, group of cells, or individual cell that includes the sequences of interest. Applying the fluorescence probes 102 to the sample 106 thus allows an experimenter to determine which genes are present and active in the sample 106.

In order to perform this identification efficiently, many FISH experiments are multiplexed. In this case, the fluorescence probes 102 include multiple different probes arranged into wells 104a, b, c . . . The probes in these wells 104a, b, c, . . . may be sequentially applied to the sample 106 to generate a sequence of images (described in connection with FIG. 1B) that are captured by a camera 108.

The camera 108 may provide the images to an image processing device 116 via an interface 128, and the image processing device 116 may store the images in a storage medium 122 (e.g., a non-transitory computer-readable medium) and process the images with a processor 120. The processor 120 may apply image processing logic 124 (described in more detail in connection with FIG. 7B) in order to identify the genes present in the images, the image processing logic 124 may make use of a convolutional neural network 126, which is a particular type of deep neural network that convolves input data with kernels, also referred to as filters, using a multiplication operation or another dot product. Convolutional neural networks 126 may accept a number of images as an input, the input forming a tensor having a shape defined by the number of the images, and the height, width, and channels of the images. After passing through a convolutional layer, the input becomes abstracted to a feature map that describes features found in the images (such as the presence or absence of a fluorescence point in the image).

The convolutional neural network 126 may identify the genes present in the images captured by the camera 108 and produce an output (such as a barcode segmentation map or list of genes), which may be stored in the storage medium 122. The output may also be stored in a data repository 118 via the interface 128.

FIG. 1B depicts an example of image data that may be captured by the camera 108. In this example, the sample 106 is a cell 110 that includes a number of genes. As each probe is applied to the sample, some of the genes hybridize with the probes and fluoresce under a light source. For instance, a first spot corresponding to a first gene might fluoresce after the first probe is applied, and thus the area that fluoresces would be considered an "on" bit and this area would be designated by a "1" by the image processing logic 124. At the same time, a second spot corresponding to a second gene might not fluoresce, making this location an "off" bit and causing the area to be designated by a "0." When the second probe is applied, the first spot might fluoresce again, making this area another "on" bit and appending a "1" to the data previously collected (so the first location would now carry the value "11"). The second spot might also fluoresce, making this an "on" bit in response to the second probe and giving the second location a value of "01." The application of a particular probe to a sample and the subsequent imaging of the fluorescing spots is referred to as a "hybridization round." A hybridization experiment typically consists of several hybridization rounds.

As additional probes are applied, the pattern of fluorescence will continue to append values to the code that is being built up for each location, eventually resulting in a code that is the same length as the number of probes, which itself represents the size of codes in the codebook for the experiment. The codebook may assign codes to each gene of interest that is targeted by the experiment's probes and is generally created when the probes are initially designed. For example, if the codebook accommodates codes that are size 13, then an output code from the first location might be "1100010101000." The output code from the second location might be "0101100100001." These codes are sometimes referred to as barcodes.

Hybridization experiments are generally set up so that every bar code in the codebook includes the same number of "on" bits. This ensures that each gene will light up the same number of times throughout the experiment, allowing fluorescence points to be identified and for errors to be recognized and corrected.

When a given code is read out in the experiment, the codebook can be queried to determine which gene corresponds to that code. The gene can then be labeled in an output processed image 114.

FIG. 1C depicts an example of image data as might correspond to one of the images 112a, b, c, . . . As can be seen in FIG. 1C, the fluorescence patterns are not necessarily located at one particular pixel in the image. Instead, the light from the pattern spreads out according to a point spread function, which enlarges the area that is fluorescing. This might be caused, for example, by the optical properties of the camera 108.

Accordingly, after these images are acquired it may be helpful to localize the fluorescing locations to a single point in order to track the fluorescing spot in subsequent images (as further probes are applied). FIG. 1D provides an example in which the fluorescing patterns of the image of FIG. 1C have been localized to specific pixels.

After the patterns have been localized to particular pixels for each hybridization round, the result will be a number of processed images 114 corresponding to the number of hybridization rounds times the number of color channels in the types of fluorescing dyes used. These processed images 114 may be examined in order to build up the above-described barcodes. When each of the barcodes in the images have been identified, the system may output a barcode segmentation map, as shown in FIG. 1E. A barcode segmentation map generally refers to a binary mapping of the barcodes in the sample, localized to the spots in the input images. In a barcode segmentation map, each barcode may be associated with multiple spots.

A number of conventional techniques exist for building a barcode segmentation map and/or identifying the barcodes in the sample. In one existing technique, referred to as the pixel-based technique, each pixel in the stack of images may be associated with an intensity value, and the intensity values for the corresponding pixels across the image stack may be converted into a pixel vector. The system may then attempt to match the pixel vector to a vector associated with each code in the code book. For example, the pixel vector may be compared with each of the reference codes based on Euclidean distance to identify the closest match. A match within a defined distance threshold may be accepted as the decoded code.

Another example of conventional FISH image processing is the peak-finding method. In this method, spots in each of the images may be localized with a peak detection method. Proximal candidate localizations across bits are subsequently clustered together and decoded into barcodes.

Although these conventional techniques can be effective, the techniques described herein provide better accuracy. This is due to the fact that they address certain problems that conventional techniques have a hard time dealing with, as described in connection with FIG. 5A, FIG. 5B, and FIG. 5C.

In contrast to conventional techniques, the present application describes a system that applies a CNN to identify features in the image data, where the features correspond to combinations of pixels representing on- or off-bits in the image data. The features may be extracted using multichannel convolutional kernels; FIG. 2 shows examples of such kernels applied to input data, including a first kernel 202 and a second kernel 204.

Each kernel has a dimensionality defined by the spatial and temporal aspects of the input images. The first two (or, in the case of three-dimensional voxel image data, three) dimensions of the kernel may be defined by a point spread function representing the degree to which a fluorescing point lights up multiple adjacent pixels in the image data. For example, the kernel's first two dimensions may represent an n×m set of pixels (7×7 in the example depicted in FIG. 2), where n and m are predetermined integers and correspond to an approximate size of a point spread function for the fluorescing spots in the image data.

By setting the size of these dimensions approximately equal to the size of the point spread function, the system can fit the entire fluorescing area into each channel in a kernel without including excess image data. When too little image data is included in the kernel (e.g., where the point spread extends beyond a given kernel), it can be difficult to track the fluorescence point across the different channels associated with the kernel (e.g., across different probes), and identification accuracy may decrease. When too much image data is included, accuracy does not necessarily increase but excess processing resources are used unnecessarily.

These first few dimensions capture spatial information about the image. A remaining dimension (e.g., a third or fourth dimension) may have a size corresponding to a predetermined number c of channels, which may correspond to the number of bits in each code in the experiment's codebook. In the depicted examples, the value of c is 13. By establishing the dimensionality of the kernels in this way, the CNN can more efficiently learn the spatial and temporal features in each image and their patterns across all bits, which makes it easier to identify the gene associated with the fluorescence spots in the image data.

FIG. 3 shows how data flows through the convolutional neural network 304 and the role that the first kernel 202 and second kernel 204 from FIG. 2 play in analyzing the images. The convolutional neural network 304 receives, as input, a number c of images corresponding to the image data in an input image stack 302. Each of the c images may be the image captured during a hybridization round—in other words, each image captures the fluorescence achieved by hybridizing a sample with a probe. It should be noted that the input is represented as c images in this example for ease of discussion—one of ordinary skill in the art will recognize that this particular structure is not prescribed and that the image data may be represented in a different way, with a different structure.

The goal of the convolutional neural network 304 is to extract the features corresponding to the point spread functions around particular pixels in the image data by applying filters or kernels, and process these features to identify the barcodes associated with the locations corresponding to these kernels. To that end, the input image stack 302 may be provided to the convolutional neural network 304, which is configured to apply multiple multichannel kernels to identify an area around a fluorescence point in the image data. Each channel may correspond to the fluorescing area around the point for a given hybridization round.

A plurality of channels associated with a given fluorescence point may be analyzed to identify a binary code for the kernel corresponding to the channels. The binary code may then be used to identify a gene associated with the fluorescence point.

By using a multichannel CNN to extract features corresponding to the fluorescence points, certain problems associated with conventional image analysis techniques can be avoided. The CNN shows robustness to problematic experimental conditions over conventional techniques such as extreme intensity variations, misaligned spots, noisy spots, and partially overlapping spots.

Furthermore, although applying a CNN requires more time and processing power overall than more conventional techniques, CNNs are highly parallelizable and the workload can therefore be distributed more readily between processors. Thus, better results can be achieved in the same (or even less) time than conventional techniques.

Moreover, once the CNN is suitably trained, there may be fewer parameters to optimize during processing. For instance, the present techniques may be able to accurately identify genes by defining only an activation threshold on the output of the CNN. On the other hand, conventional techniques might need to optimize a decoding process to determine which spots belong to which genes, a spatial factor to determine whether two pixels represent the same fluorescence point or two different points that are close together, the intensity factor, etc.

The first layer (convolutional layer 306) of the convolutional neural network 304 may be made up of the plurality of kernels (e.g., 128). In this example, the first convolutional layer 306 has a dimensionality of 7×7×13 (corresponding to the point spread function and number of channels, as discussed above) and applies 128 such kernels. This allows basic patterns in the images to be extracted efficiently by convolving over the image data; these basic patterns can then be passed to the hidden layers of the CNN for further processing to extract higher-order complexities. Additional convolutional layers 308, 310, etc. may be employed, where the additional convolutional layers apply progressively more kernels having greater kernel dimensions. For instance, in a second convolutional layer 308 in FIG. 3, 256 kernels having a dimensionality of 5×5×128 may be applied; in a third such layer 310, 512 kernels having a dimensionality of 3×3×256 may be employed. A fourth layer might employ 1024 kernels of dimensionality 3×3×512.

The convolutional layers may be applied in conjunction with a rectified linear unit activation function and a batch normalization operation. Batch normalization in particular addresses a problem with conventional techniques (particularly the pixel-based method), which are known to be unable to precisely normalize the image data across the channels.

A final, logistic regression layer 312 may encode each respective pixel of the input image stack 302 as a vector of latent features (e.g., a 1024-bit vector), and apply pixelwise logistic regression to classify an output of the layer as a probability of a target gene being localized at the respective pixel. Encoding the pixels as vectors allows the vectors to represent all the combinations of spatial patterns that the different layers of convolutional kernels in the CNN pick up. A 1×1 convolution kernel with a sigmoid activation layer can then perform the pixelwise logistic regression. This technique tends to be much more informative as to whether a spot is being picked up at a given pixel location than conventional, hand-coded alternatives.

The output of the convolutional neural network 304 may be a barcode segmentation map 314 indicating a probability of the gene being localized at each location. In order to identify which gene corresponds to which point, a ground truth 316 representing known fluorescence patterns for previously identified genes may be consulted. The ground truth 316 for different genes may be compared to data output by the final layer of the CNN, and a similarity between the ground truth for a given gene and the CNN output may be calculated (e.g., by using a loss function).

In simplest form, a pixel in the barcode segmentation map 314 may be a binary output (e.g., 0 or 1) indicating whether a particular barcode was identified at the location of the pixel. In this case, a surrogate barcode is selected. In another embodiment referred to as "multi-class, single-label," each pixel location may be associated with an n-bit array that allows up to a single barcode to be identified at the pixel. One example of the output encoding of such a scheme may be:

[1 0 0 0]: null (no barcodes identified)
[0 1 0 0]: Barcode A
[0 0 1 0]: Barcode B
[0 0 0 1]: Barcode C In another embodiment, referred to as "multi-class, multi-label," each pixel is encoded with an array, as in the multi-class, single-label example. However, as opposed to the single-label example, each instance of the multi-label array can encode multiple barcodes. This allows for combinations of barcodes to be represented at each pixel, as in the example below:

[0 0 0]: Null
[1 0 1]: Barcodes A & C
[0 1 0]: Barcode B
[0 1 1]: Barcodes B & C One potential benefit of the multi-class, single label approach is that, in a given experiment, two barcodes from two different pixels might overlap each other. The multi-class single-label approach could identify this problematic condition and pick out only the most prevalent barcode.

Different types of activation methods for the last layer of the CNN may be employed for different types of decoder networks, and different loss functions may be useful in different contexts. A summary of suitable combinations is provided below in Table 1

TABLE 1

| Problem Type | Last-Layer Activation | Loss Function |
| --- | --- | --- |
| Binary Classification | Sigmoid | Binary crossentropy |
| Multiclass, Single Label | Softmax | Categorical Crossentropy |
| Multiclass, Multi Label | Sigmoid | Binary crossentropy |

The ground truth used as labels for the training of the CNN may be generated in a variety of different ways, although some generation methods may be more suited to particular types of output representations than others. For example, the ground truth may be generated by image segmentation of multiplexed FISH experimental data, as in the above-noted pixel-based decoder, and peak-based decoder techniques. Alternatively or in addition, the ground truth may be generated using image segmentation of smFISH experimental data that is colocalized with MERFISH.

Alternatively or in addition, training data with their associated ground truth may be generated using simulations.

These techniques may be combined to generate more data for comparison, but each type has its own advantages and disadvantages. For example, smFISH data can only be collected for a subset of genes, and is primarily suited to surrogate or binary classification, whereas the other techniques may be employed with surrogate, multi-class single label, and multi-class, multi-label schemes.

Figure 4A:
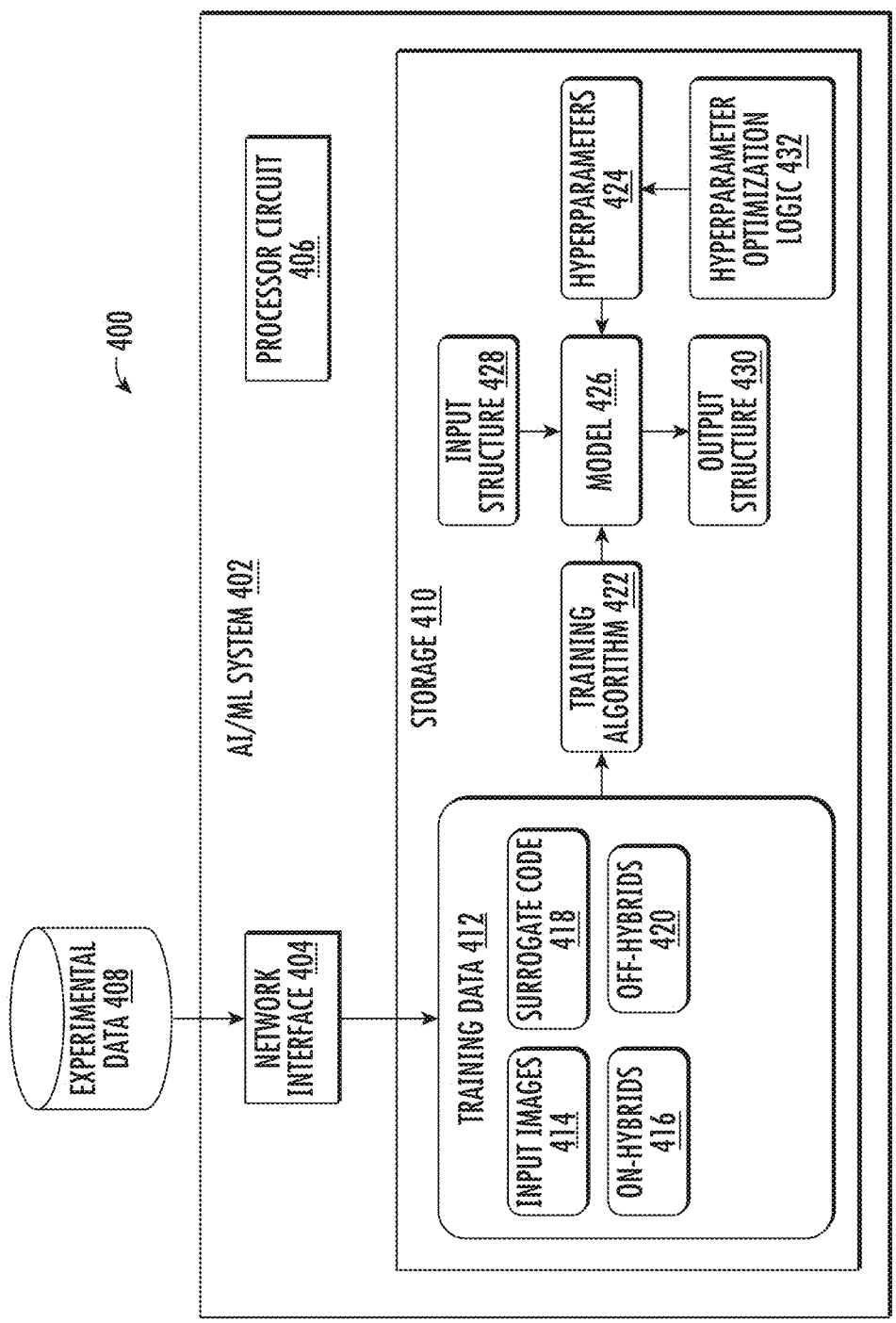
FIG. 4A illustrates an exemplary artificial intelligence/machine learning (AI/ML) system suitable for use with exemplary embodiments.

The convolutional neural network 304 is described in more detail in connection with FIG. 4A, FIG. 4B, and FIG. 4C.

As noted above, artificial intelligence/machine learning (AI/ML) may be applied (in the form of a convolutional neural network) to extract image features corresponding to genes that may or may not be fluorescing in any given hybridization round. To that end, FIG. 4A depicts an AI/ML environment 400 suitable for use with exemplary embodiments.

The AI/ML environment 400 may include an AI/ML System 402, such as a computing device that applies an AI/ML algorithm to learn relationships between the above-noted image features and barcodes.

The AI/ML System 402 may make use of experimental data 408 returned by an experimental apparatus as samples are tested. In some cases, the experimental data 408 may include pre-existing experimental data from databases, libraries, repositories, etc. The experimental data 408 may include an identification of a sample being tested, and measurements of the fluorescence properties of the genes in the sample. The experimental data 408 may be collocated with the AI/ML System 402 (e.g., stored in a Storage 410 of the AI/ML System 402), may be remote from the AI/ML System 402 and accessed via a Network Interface 404, or may be a combination of local and remote data.

In the Training Data 412, the experimental data 408 returned from experimental apparatuses may be supplemented by data learned by modeling and simulating gene fluorescence in software, and by parsing scientific and academic literature for information about the fluorescence patterns.

As noted above, the AI/ML System 402 may include a Storage 410, which may include a hard drive, solid state storage, and/or random-access memory. The storage may hold Training Data 412, which may include input images 414 corresponding to the input image stack 302. The input images 414 may include one or more features that can fluoresce or not at corresponding channels across the input image stack; in general, exemplary embodiments can operate on a smaller amount of training data because the channels in the image data can be permuted and randomized as described in more detail in connection with FIG. 4B.

A channel from the Training Data 412, when considered across the image stack, may be associated with the barcode that corresponds to the gene represented in the channel. This barcode may be stored as a surrogate code 418, which is described in more detail below. When the channels are permuted and randomized, they may maintain the on/off sequence represented by the surrogate code 418. In order to allow the channels to be permuted and randomized, the hybridized channels representing "on" configurations (fluorescing genes) and the channels representing "off" configurations (non-fluorescing genes) must be identified; to that end, the Training Data 412 includes indicators of the on-hybrids 416 and the off-hybrids 420.

The Training Data 412 may be applied to train a model 426, such as a convolutional neural network. Any suitable Training Algorithm 422 may be used to train the model 426. Nonetheless, the example depicted in FIG. 4A may be particularly well-suited to a supervised training algorithm. In the supervised training algorithm, the AI/ML System 402 may use the input images 414 as input data and may adjust parameters associated with the convolutional neural network so that the network learns a mapping between the input images 414 and the surrogate code 418. In this case, the surrogate code 418 may be used as labels for a given gene.

The Training Algorithm 422 may be applied using a Processor Circuit 406, which may include suitable hardware processing resources that operate on the logic and structures in the Storage 410. The Training Algorithm 422 and/or the development of the trained model 426 may be at least partially dependent on model Hyperparameters 424; in exemplary embodiments, the model Hyperparameters 424 may be automatically selected based on Hyperparameter Optimization logic 432, which may include any known hyperparameter optimization techniques as appropriate to the model 426 selected and the Training Algorithm 422 to be used. For example, in the context of a convolutional neural network, the model Hyperparameters 424 may include the number and shape of the filters to be applied, the max pooling shape, the number and connectedness/configuration of hidden layers, an activation threshold with which to recognize an "on" or "off" bit, etc.

Optionally, the model 426 may be re-trained over time, in order to accommodate new knowledge about fluorescence patterns and new experiments performed.

In some embodiments, some of the Training Data 412 may be used to initially train the model 426, and some may be held back as a validation subset. The portion of the Training Data 412 not including the validation subset may be used to train the model 426, whereas the validation subset may be held back and used to test the trained model 426 to verify that the model 426 is able to generalize its predictions to new data.

Once the model 426 is trained, it may be applied (by the Processor Circuit 406) to new input data in an inference process. The new input data may include current multiplexed FISH experimental data. This input to the model 426 may be formatted according to a predefined input structure 428 mirroring the way that the Training Data 412 was provided to the model 426. The model 426 may generate an output structure 430 which may be, for example, a list of genes, a barcode segmentation map, a probability that a gene exists at a particular location in the input image stack, etc.

The above description pertains to a particular kind of AI/ML System 402, which applies supervised learning techniques given available training data with input/result pairs. However, the present invention is not limited to use with a specific AI/ML paradigm, and other types of AI/ML techniques may be used.

According to exemplary embodiments, the Training Algorithm 422 may exploit certain properties of FISH experiments to allow for more efficient training that relies on less training data. Because obtaining a sufficient amount of suitable training data is often a challenge, the ability to reduce the amount of training data required can be a significant boon.

As shown in FIG. 4B, during training the convolutional neural network 304 may be provided with an input image stack 302 that includes data present on channels 434. In this example, the channels are presented in the order 1, 2, 3, 4, 5. Channels 1 and 5 are "on" channels, while channels 2, 3, and 4 are "off" channels. Thus, the surrogate code for this example is "10001."

The convolutional neural network 304 is therefore trained to recognize the code "10001," which corresponds to an entry in a FISH codebook. Helpfully, FISH codebooks are created so that each code includes the same number of "on" bits, and so any code in the codebook can be represented by rearranging the bits in any other code. In this way, the convolutional neural network 304 can perform inference, learning to generalize from a single surrogate code 418 to all other barcodes.

During the inference phase, as shown in FIG. 4C, the input image stack 302 may represent a different code ("01001") than the surrogate code 418 ("10001"). However, the convolutional neural network 304 can still recognize the new code by rearranging the channels in the image stack until the on/off configuration matches the configuration from the surrogate code (e.g., swapping the first and second channels, so that the first channel becomes an "on" bit and the second channel becomes an "off" bit). The convolutional neural network 304 could also (or alternatively) rearrange the input image stack until all codes in the image have been recognized. The convolutional neural network 304 can thus analyze the new image stack without changing its internal weightings and identify the correct gene.

However, a problem can arise when performing the training using the above-described technique. The convolutional neural network 304 can be generalized from a single barcode only if it is assumed that the statistical distribution of the fluorescence patterns is the same from hybridization round to hybridization round. In practice, this tends not to be true, for several reasons. The normalization of the images may be imprecise, the number of genes represented in each hybridization round may vary, there may be experimental noise such as probe binding affinity variations or probe disassociations across hybridization rounds, etc. Thus, a CNN trained with a small subset of genes would have a different input distribution than the remaining genes, and thus would not generalize well. When trained, the CNN exhibits a degree of overfitting towards the trained surrogate barcode. Exemplary embodiments solve this problem by generating additional training data from the existing training data.

This can be achieved by taking the channels representing on-bits and rearranging them into different permutations. For example, given a 5-bit barcode of "1 1 0 0 1" with the channels arranged in an order {c1, c2, c3, c4, c5}, the "on" channels (c1, c2, and c5) can be reordered into several different arrangements without changing the barcode. For instance, if c2 and c5 were swapped, the resulting pattern would still be "1 1 0 0 1." Accordingly, some embodiments permute the "on" channels in order to generate additional training data.

Permuting the on-bits allows multiple different training sets to be generated from the same training images while preserving the same surrogate code pattern. Each such training set would have a different pattern of input distributions, but since each training set has the same target label (the surrogate barcode), the network learns to be invariant to varying input distributions.

A further advancement takes the off-bits and rearranges them at random among the on-bit permutations. This allows even more variable training sets to be developed from the same image data.

The result of this permuting and randomizing is that a single set of input training images representing a surrogate code having N on-bits can be rearranged to generate N! training sets. This represents a significant increase in the amount of training data available and given the variations within the different hybridization rounds significantly reduces the amount of overfitting in the CNN.

The thus-trained CNN is able to recognize barcodes in FISH image data more accurately than conventional pixel-based or Gaussian fit methods. This is partly because a CNN trained in this way is able to better handle several problematic situations in which conventional techniques do not perform well.

Figure 5B:
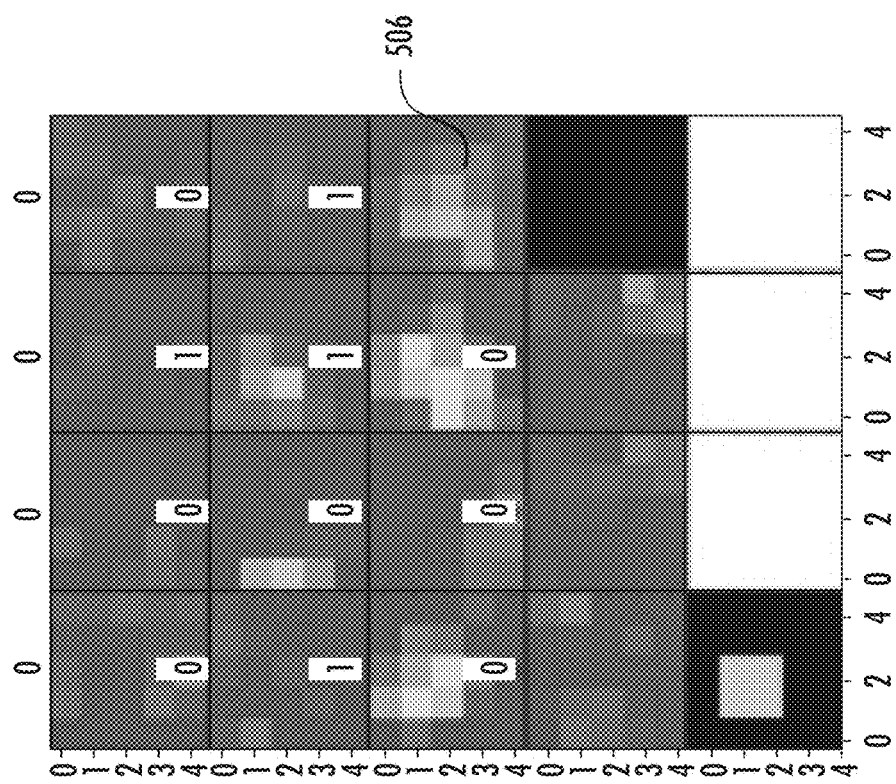
FIG. 5B illustrates an example of misaligned spots in FISH data.
Figure 5A:
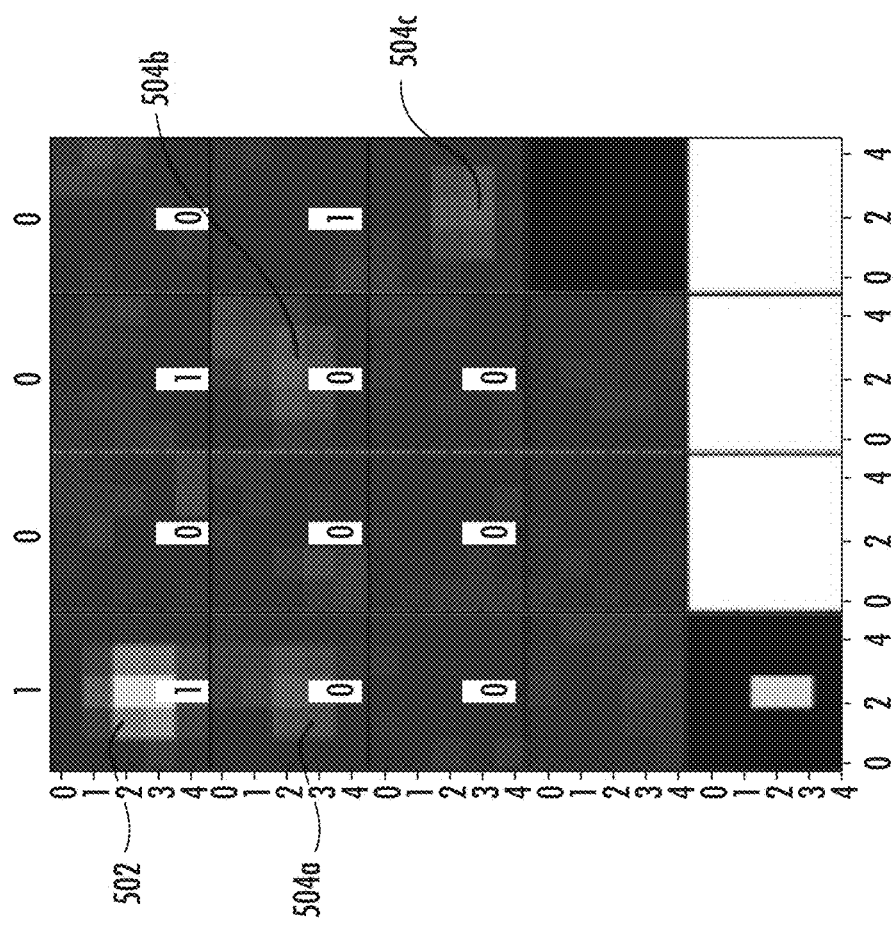
FIG. 5A illustrates an example of extreme intensity variations in FISH data.

For example, FIG. 5A depicts an example in which there are extreme intensity variations among fluorescing spots. This could occur for a number of reasons, such as an insufficient amount of material from the probe hybridizing with the sample in some locations. In this example, a high intensity spot 502 exists in the first channel, which has an intensity significantly greater than several low-intensity spots 504a, b, c that exist in other channels. These other channels are fluorescing, but to a smaller degree that results in a relatively large vector distance (in one example, 0.59) that is typically above the distance threshold used in pixel decoding methods. However, in an experiment, a CNN designed according to the exemplary embodiments described herein correctly segmented the barcode.

FIG. 5B depicts another example in which some of the spots have become misaligned between the different channels, resulting in noisy misaligned spots 506 of low intensity. Conventional techniques would struggle to differentiate between "off" bits and misaligned noisy spots in this example (for instance, such a technique might have difficulty distinguishing between the noisy spot in channel 6, which is intended to be an "off" bit, and the one in channel 7, which is intended to be an "on" bit). However, in an experiment a CNN designed according to the exemplary embodiments described herein was able to segment the barcode.

Figure 5C:
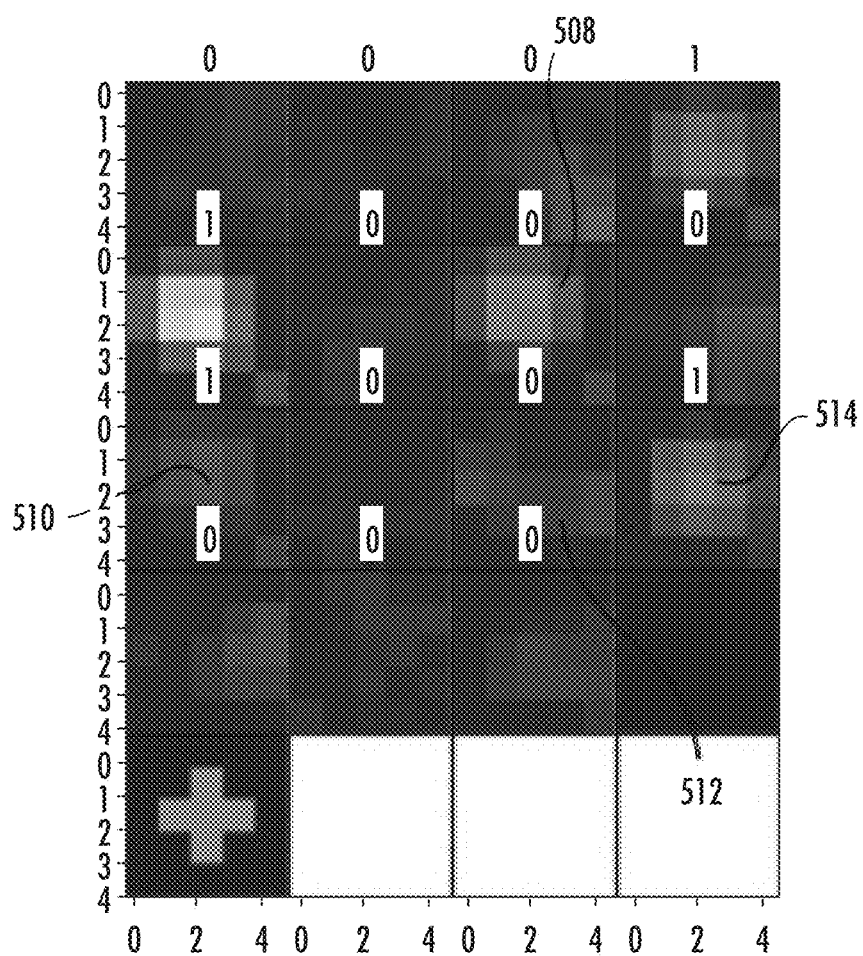
FIG. 5C illustrates an example of overlapping spots in FISH data.

FIG. 5C depicts a particularly tricky scenario, where two spots in the sample are so close to each other that they appear to overlap in the image data. Conventional techniques might detect this area as lighting up too many times across the hybridization rounds—for instance, if the codebook includes codes that include 4 on-bits, a conventional technique might detect a single gene in this area with 6 on-bits. In this example, two genes were arranged particularly close together. These genes had the following bit codes:

[0 0 0 1 1 0 0 0 1 0 0 1 0 0 0]
[0 0 0 1 1 0 1 0 0 0 1 0 0 0 0]

A conventional technique might identify this area as belonging to a gene having a code [0 0 0 1 1 0 1 0 1 0 1 1 0 0 0]. However, the exemplary CNN described herein correctly output the code [0 0 0 1 1 0 0 0 1 0 0 1 0 0 0] for the first gene, thus finding a gene that the conventional technique missed.

In order to demonstrate the efficacy of the exemplary techniques described herein, a test was conducted by imaging a sample to generate an input image stack 302 as shown in FIG. 6A. A ground truth barcode segmentation map 602 was generated for this experiment, representing a predicted barcode segmentation map that would be generated by an ideal image processor. The ground truth barcode segmentation map 602 is shown in FIG. 6B.

A CNN according to the exemplary embodiments described herein was trained and applied to the input image stack 302. The resulting surrogate code model barcode segmentation map 604 output by the CNN is depicted in FIG. 6C.

Finally, the input image stack 302 was processed using a pixel-based technique as described above. The resulting pixel pipeline barcode segmentation map 606 is shown in FIG. 6D.

As can be seen by comparing the ground truth barcode segmentation map 602 to the surrogate code model barcode segmentation map 604 and pixel pipeline barcode segmentation map 606, the surrogate code model barcode segmentation map 604 generated more detailed results.

Figure 7A:
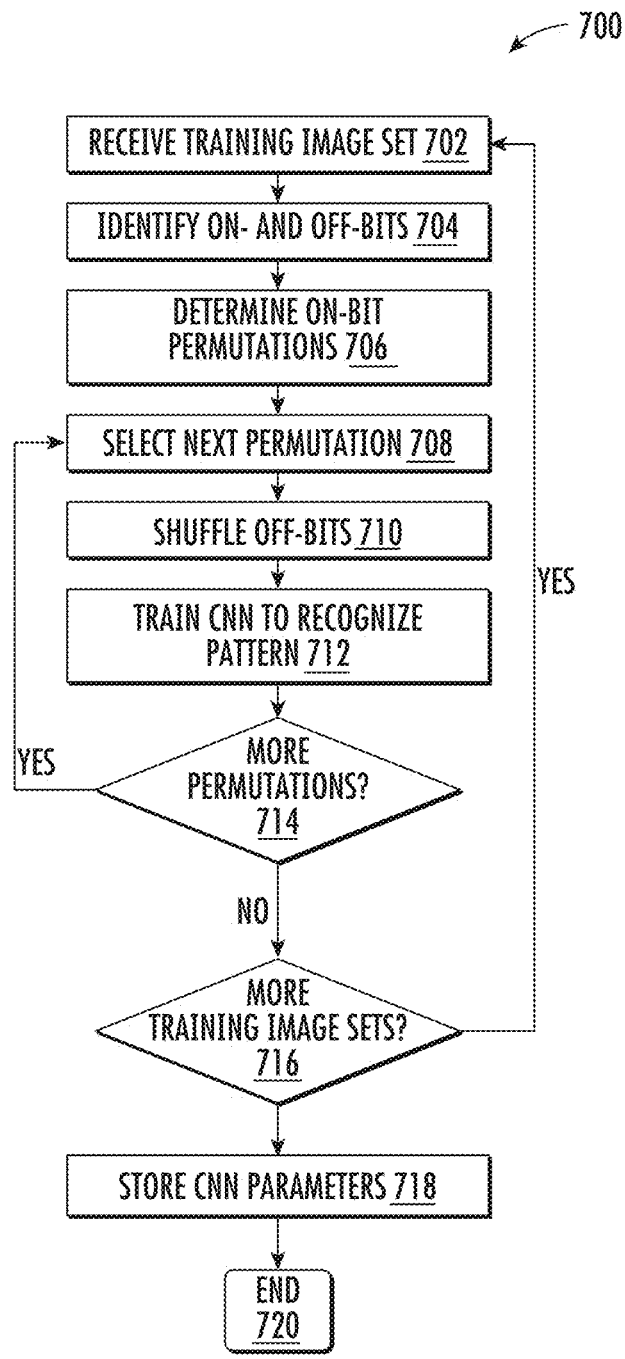
FIG. 7A is a flow chart depicting logic suitable for training a convolutional neural network according to exemplary embodiments.

The above-described interfaces and processes may be implemented by suitable logic, as illustrated for example in FIG. 7A. The logic may be stored as instructions on a non-transitory computer-readable storage medium and may be configured to cause a processing circuit to perform the described operations. The storage medium and hardware may be co-located, or the instructions may be stored remotely from the processor. Collectively, the medium and processor may form a system. FIG. 7A in particular describes training logic 700 suitable for training a CNN as discussed above in connection with FIG. 4A through FIG. 4.

At block 702, the system may receive a training image set. The training image set may be a set of images from a multiplexed FISH experiment, with a number c of images corresponding to a number of hybridization rounds in the FISH experiment (which may correspond to the number of codes in the experiment's codebook).

At block 704, the system may identify on- and off-bits in the training image set. The on bits may correspond to channels in the training image set that are considered to be fluorescing (e.g., an intensity of the channel exceeds a predetermined threshold intensity). The off bits may be bits that are not considered to be fluorescing (e.g., their intensities are below the predetermined threshold intensity).

At block 706, the system may determine on-bit permutations. As noted above, an arrangement of channels with N on-bits can be arranged into N! permutations. Each of these permutations may be identified in order to generate N! training data sets.

At block 708, the system may select the next permutation of on-bits that were identified in block 706. The system may arrange the on-bit channels into an arrangement according to the selected permutation.

At block 710, the system may access the off-bits identified in block 704 and may randomly shuffle them between the on-bits in the permutation selected at block 708. This may generate a particular pattern corresponding to a surrogate code. The system may train the CNN to recognize the pattern at block 712. For example, the system may use the generated permutation with shuffled off-bits as a training image and use reinforcement learning to train the CNN to recognize that the pattern corresponds to the surrogate code. To that end, the system may adjust weights or parameters associated with the layers of the CNN to cause the CNN to improve its performance in recognizing the pattern as corresponding to the surrogate code.

At decision block 714, it may be determined whether additional permutations of the on-bits remain to be applied as training data. If so, processing returns to block 708 and the next permutation is selected for processing. If not, processing proceeds to decision block 716.

At block 716, the system determines whether additional training image sets exist that may be used for training data. If so, processing returns to block 702 and the next training image set may be selected for processing. If not, processing may proceed to block 718, where the parameters of the trained CNN are stored for future use. Processing then proceeds to block 720 and ends.

Figure 7B:
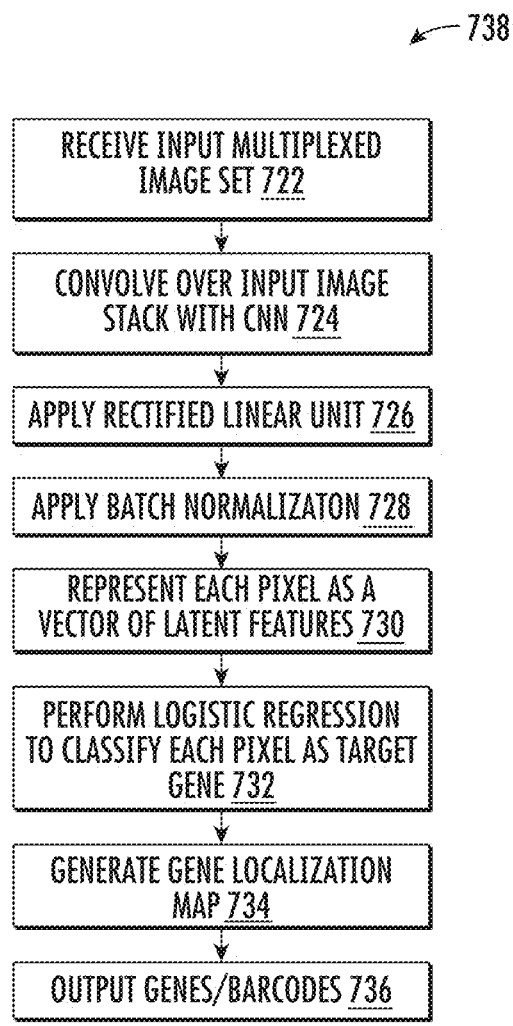
FIG. 7B is a flow chart depicting logic suitable for applying a convolutional neural network to FISH image data according to exemplary embodiments.

A further example of logic is depicted in FIG. 7B, which illustrates exemplary image decoding logic 738 suitable for using a CNN to analyze image data. The logic may be stored as instructions on a non-transitory computer-readable storage medium and may be configured to cause a processing circuit to perform the described operations. The storage medium and hardware may be co-located, or the instructions may be stored remotely from the processor. Collectively, the medium and processor may form a system.

At block 722, the system may receive an input multiplexed image set. The image set may be image data from a multiplexed FISH experiment, and may be represented as a stack of c images, where c is an integer equal to the number of hybridization rounds in the FISH experiment (which may also correspond to the number of bits in each code in the codebook of the experiment). The image set may be received from an experimental apparatus, such as the one depicted in FIG. 2.

At block 724, the system may apply the input image stack to a CNN. The CNN may convolve over the input image stack using multiple kernels to extract relatively low-level features. Higher-level features may be extracted in subsequent convolutional layers. At each convolutional layer, at block 726 and block 728, the CNN may apply a rectified linear unit and batch normalization, as previously described.

At block 730, the CNN may represent each pixel as a vector of latent features, which may be used at block 732 to perform logistic regression to probabilistically classify each pixel in the input multiplexed image set as a target gene. Based on the results of the regression, at block 734 the CNN may output a gene localization map. At block 736, the CNN may output the barcode segmentation map, and optionally one or more identified genes and/or the barcodes of the genes.

Figure 8:
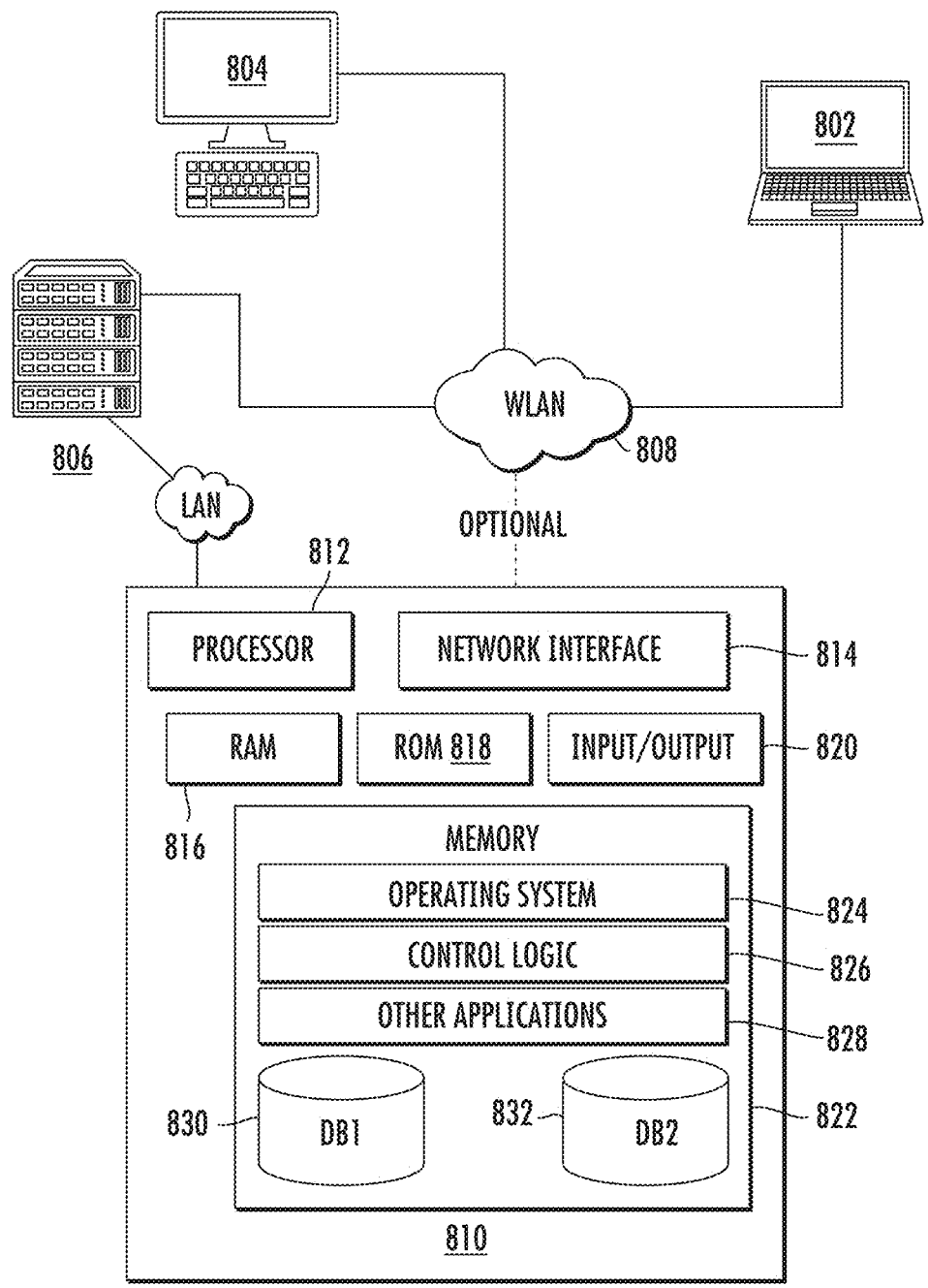
FIG. 8 depicts an illustrative computer system architecture that may be used to practice exemplary embodiments described herein.

FIG. 8 illustrates one example of a system architecture and data processing device that may be used to implement one or more illustrative aspects described herein in a standalone and/or networked environment. Various network nodes, such as the data server 810, web server 806, computer 804, and laptop 802 may be interconnected via a wide area network 808 (WAN), such as the internet. Other networks may also or alternatively be used, including private intranets, corporate networks, LANs, metropolitan area networks (MANs) wireless networks, personal networks (PANs), and the like. Network 808 is for illustration purposes and may be replaced with fewer or additional computer networks. A local area network (LAN) may have one or more of any known LAN topology and may use one or more of a variety of different protocols, such as ethernet. Devices data server 810, web server 806, computer 804, laptop 802 and other devices (not shown) may be connected to one or more of the networks via twisted pair wires, coaxial cable, fiber optics, radio waves or other communication media.

Computer software, hardware, and networks may be utilized in a variety of different system environments, including standalone, networked, remote-access (aka, remote desktop), virtualized, and/or cloud-based environments, among others.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 810, web server 806, and client computer 804, laptop 802. Data server 810 provides overall access, control and administration of databases and control software for performing one or more illustrative aspects described herein. Data server 810 may be connected to web server 806 through which users interact with and obtain data as requested. Alternatively, data server 810 may act as a web server itself and be directly connected to the internet. Data server 810 may be connected to web server 806 through the network 808 (e.g., the internet), via direct or indirect connection, or via some other network.

Users may interact with the data server 810 using remote computer 804, laptop 802, e.g., using a web browser to connect to the data server 810 via one or more externally exposed web sites hosted by web server 806. Client computer 804, laptop 802 may be used in concert with data server 810 to access data stored therein or may be used for other purposes. For example, from client computer 804, a user may access web server 806 using an internet browser, as is known in the art, or by executing a software application that communicates with web server 806 and/or data server 810 over a computer network (such as the internet).

Servers and applications may be combined on the same physical machines, and retain separate virtual or logical addresses, or may reside on separate physical machines. FIG. 8 illustrates just one example of a network architecture that may be used, and those of skill in the art will appreciate that the specific network architecture and data processing devices used may vary, and are secondary to the functionality that they provide, as further described herein. For example, services provided by web server 806 and data server 810 may be combined on a single server.

Each component data server 810, web server 806, computer 804, laptop 802 may be any type of known computer, server, or data processing device. Data server 810, e.g., may include a processor 812 controlling overall operation of the data server 810. Data server 810 may further include RAM 816, ROM 818, network interface 814, input/output interfaces 820 (e.g., keyboard, mouse, display, printer, etc.), and memory 822. Input/output interfaces 820 may include a variety of interface units and drives for reading, writing, displaying, and/or printing data or files. Memory 822 may further store operating system software 824 for controlling overall operation of the data server 810, control logic 826 for instructing data server 810 to perform aspects described herein, and other application software 828 providing secondary, support, and/or other functionality which may or may not be used in conjunction with aspects described herein. The control logic may also be referred to herein as the data server software control logic 826. Functionality of the data server software may refer to operations or decisions made automatically based on rules coded into the control logic, made manually by a user providing input into the system, and/or a combination of automatic processing based on user input (e.g., queries, data updates, etc.).

Memory 822 may also store data used in performance of one or more aspects described herein, including a first database 832 and a second database 830. In some embodiments, the first database may include the second database (e.g., as a separate table, report, etc.). That is, the information can be stored in a single database, or separated into different logical, virtual, or physical databases, depending on system design. Web server 806, computer 804, laptop 802 may have similar or different architecture as described with respect to data server 810. Those of skill in the art will appreciate that the functionality of data server 810 (or web server 806, computer 804, laptop 802) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) HTML or XML. The computer executable instructions may be stored on a computer readable medium such as a non-volatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. A method comprising:
   sequentially applying a plurality of probes to a sample of a fluorescence in-situ hybridization (FISH) experiment;
   capturing, using a camera, a sequence of images of the sample, where each image in the sequence is captured after one of the plurality of probes is applied to the sample;
   receiving, at a computing device, image data including the sequence of images;
   providing, at the computing device, the image data to a convolutional neural network (CNN) having multi-channel convolutional layers, the CNN configured to analyze an area around a fluorescence point in the image data using a kernel;
   applying, at the computing device, the kernel to identify a barcode for the fluorescence point;
   using, at the computing device, the barcode to identify a gene associated with the fluorescence point; and
   generating, at the computing device, a barcode segmentation map, the barcode segmentation map comprising an indication identifying a location in the image data where the identified gene is located.

2. The method of claim 1, wherein a first of the convolutional layers comprises a number of channels corresponding to a number of bits in a code book associated with the FISH experiment.

3. The method of claim 1, wherein the CNN is a three-dimensional CNN and the image data comprises three-dimensional voxel data.

4. The of claim 1, wherein the kernel has a size corresponding to a point spread function around the fluorescence point.

5. The method of claim 1, wherein the CNN includes at least one of a rectified linear unit (ReLU) or a batch normalization (batchnorm), one or both of the ReLU or the batchnorm being configured to extract features with higher order complexities than would be extracted without the ReLU or batchnorm.

6. The method of claim 1, wherein a final layer of the CNN encodes each respective pixel of the image data as a vector of latent features, and applies pixelwise logistic regression to classify an output of the layer as a probability of a target gene being localized at the respective pixel.

7. The method of claim 1, further comprising training, at the computing device, the CNN, the training comprising:
   retrieving training image data having a plurality of channels arranged in an original order;
   identifying a surrogate code pattern associated with the original order;
   identifying one or more of the channels that are in an on configuration and one or more channels that are in an off configuration; and
   training the CNN to activate to the surrogate code pattern using a plurality of generated training sets, each set comprising the plurality of channels with on-bits rearranged in varying permutations so that an arrangement of the on-configuration channels in each training set corresponds to the original order.

8. The method of claim 7, further comprising randomly assigning, by the computing device, the off-configuration channels among the on-configuration channels so that an arrangement of the off-configuration channels corresponds to the original order.

9. The method of claim 7, further comprising applying, by the computing device, the trained CNN to the image data to infer binary code, where the binary code differs from the surrogate code.

10. A non-transitory computer-readable storage medium, the computer-readable storage medium including instructions that when executed by a computer, cause the computer to:
    receive image data from a camera of a fluorescence in-situ hybridization (FISH) experiment, the image data comprising a sequence of images of a sample captured as a plurality of probes were sequentially applied to the sample;
    provide the image data to a convolutional neural network (CNN) having multichannel convolutional layers, the CNN configured to analyze an area around a fluorescence point in the image data using a kernel;
    apply the kernel to identify a binary code for the fluorescence point;
    use the binary code to identify a gene associated with the fluorescence point; and
    generate a barcode segmentation map, the barcode segmentation map comprising an indication identifying a location in the image data where the identified gene is located.

11. The computer-readable storage medium of claim 10, wherein a first one of the convolutional layers comprise a number of channels corresponding to a number of bits in a code book associated with the FISH experiment.

12. The computer-readable storage medium of claim 10, wherein the CNN is a three-dimensional CNN and the image data comprises three-dimensional voxel data.

13. The computer-readable storage medium of claim 10, wherein the kernel has a size corresponding to a point spread function around the fluorescence point.

14. The computer-readable storage medium of claim 10, wherein the CNN includes at least one of a rectified linear unit (ReLU) or a batch normalization (batchnorm), one or both of the ReLU or the batchnorm being configured to extract features with higher order complexities than would be extracted without the ReLU or batchnorm.

15. The computer-readable storage medium of claim 10, wherein a final layer of the CNN encodes each respective pixel of the image data as a vector of latent features, and applies pixelwise logistic regression to classify an output of the layer as a probability of a target gene being localized at the respective pixel.

16. The computer-readable storage medium of claim 10, wherein the instructions further configure the computer to train the CNN, the training comprising:
    retrieving training image data having a plurality of channels arranged in an original order;
    identifying a surrogate code pattern associated with the original order;
    identifying one or more of the channels that are in an on configuration and one or more channels that are in an off configuration; and
    training the CNN to activate to the surrogate code pattern using a plurality of generated training sets, each set comprising the plurality of channels with on-bits rearranged in varying permutations so that an arrangement of the on-configuration channels in each training set corresponds to the original order.

17. The computer-readable storage medium of claim 16, wherein the instructions further configure the apparatus to randomly assign the off-configuration channels among the on-configuration channels so that an arrangement of the off-configuration channels corresponds to the original order.

18. The computer-readable storage medium of claim 16, wherein the instructions further configure the computer to apply the trained CNN to the image data to infer the binary code, where the binary code differs from the surrogate code.

19. A system comprising:
a camera configured to capture a sequence of images of a sample of a fluorescence in-situ hybridization (FISH) experiment, wherein a plurality of probes are sequentially applied to the sample, wherein each image in the sequence is captured after one of the plurality of probes is applied to the sample; and
a computing apparatus, the computing apparatus comprising:
a processor; and
a memory storing instructions that, when executed by the processor, configure the processor to:
receive, from the camera, image data that includes the sequence of images regarding the fluorescence in-situ hybridization (FISH) experiment;
provide the image data to a convolutional neural network (CNN) having multichannel convolutional layers, the CNN configured to analyze an area around a fluorescence point in the image data using a kernel;
apply the kernel to identify a binary code for the fluorescence point;
use the binary code to identify a gene associated with the fluorescence point; and
generate a barcode segmentation map, the barcode segmentation map comprising an indication identifying a location in the image data where the identified gene is located.

20. The system of claim 19, wherein a first one of the convolutional layers comprises a number of channels corresponding to a number of bits in a code book associated with the FISH experiment.

21. The system of claim 19, wherein the CNN is a three-dimensional CNN and the image data comprises three-dimensional voxel data.

22. The system of claim 19, wherein the kernel has a size corresponding to a point spread function around the fluorescence point.

23. The system of claim 19, wherein the CNN includes at least one of a rectified linear unit (ReLU) or a batch normalization (batchnorm), one or both of the ReLU or the batchnorm being configured to extract features with higher order complexities than would be extracted without the ReLU or batchnorm.

24. The system of claim 19, wherein a final layer of the CNN encodes each respective pixel of the image data as a vector of latent features, and applies pixelwise logistic regression to classify an output of the layer as a probability of a target gene being localized at the respective pixel.

25. The system of claim 19, wherein the instructions further configure the processor to train the CNN, the training comprising:
retrieving training image data having a plurality of channels arranged in an original order;
identifying a surrogate code pattern associated with the original order;
identifying one or more of the channels that are in an on configuration and one or more channels that are in an off configuration; and
training the CNN to activate to the surrogate code pattern using a plurality of generated training sets, each set comprising the plurality of channels with on-bits rearranged in varying permutations so that an arrangement of the on-configuration channels in each training set corresponds to the original order.

26. The system of claim 25, wherein the instructions further configure the processor to randomly assign the off-configuration channels among the on-configuration channels so that an arrangement of the off-configuration channels corresponds to the original order.

27. The system of claim 25, wherein the instructions further configure the processor to apply the trained CNN to the image data to infer the binary code, where the binary code differs from the surrogate code.

* * * * *